(12) United States Patent
Kutto et al.

(10) Patent No.: US 10,022,037 B2
(45) Date of Patent: Jul. 17, 2018

(54) DISHWASHER WITH VERTICALLY ADJUSTABLE DISH RACK

(71) Applicant: Whirlpool Corporation, Benton Harbor, MI (US)

(72) Inventors: Kevin T. Kutto, Maharashtra (IN); Ronald M. Nowell, Jr., Saint Joseph, MI (US); Kapil Gupta, Maharashtra (IN); Matthew M. Hansen, Saint Joseph, MI (US); Sujay S. Dabade, Maharashtra (IN); Harshal J. Bhajak, Maharashtra (IN); Richard Lawrence Kretz, Findlay, OH (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

(21) Appl. No.: 15/222,356

(22) Filed: Jul. 28, 2016

(65) Prior Publication Data

US 2016/0331204 A1  Nov. 17, 2016

Related U.S. Application Data

(63) Continuation-in-part of application No. 13/758,121, filed on Feb. 4, 2013, now Pat. No. 9,579,009.

(51) Int. Cl.
*A47L 15/00* (2006.01)
*A47L 15/50* (2006.01)
*B23P 19/00* (2006.01)

(52) U.S. Cl.
CPC ......... *A47L 15/504* (2013.01); *A47L 15/0084* (2013.01); *A47L 15/50* (2013.01); *A47L 15/502* (2013.01); *A47L 15/507* (2013.01); *B23P 19/00* (2013.01); *Y10T 29/49826* (2015.01)

(58) Field of Classification Search
CPC .... A47L 15/0084; A47L 15/50; A47L 15/502; A47L 15/504; A47L 15/507; B23P 19/00; Y10T 29/49826
USPC .................................. 134/56 D, 57 D, 58 D
See application file for complete search history.

(56) References Cited

U.S. PATENT DOCUMENTS

| | | |
|---|---|---|
| 7,410,228 B2 | 8/2008 | Dickson et al. |
| 7,418,967 B2 | 9/2008 | Kim |
| 7,775,378 B2 | 8/2010 | Tynes et al. |
| 8,191,560 B2 | 6/2012 | Mallory et al. |
| 8,192,557 B2 | 6/2012 | Ryu et al. |
| 8,534,471 B2 | 9/2013 | Wong et al. |
| 8,840,201 B2 | 9/2014 | Garnett et al. |
| 9,113,773 B2 | 8/2015 | Bartloff et al. |
| 2005/0039782 A1 | 2/2005 | Kim |

(Continued)

*Primary Examiner* — Levon J Shahinian
(74) *Attorney, Agent, or Firm* — McGarry Bair PC

(57) ABSTRACT

A dish rack is supported for vertical movement relative to a dishwasher tub between lowered and raised positions. To raise the rack, spring biased locking levers provided on side walls of the dish rack are pivoted to cause wing members of the locking levers to release locking tabs, extending in a cantilevered fashion from locking straps secured to the rack, from locking openings provided in adjuster arms which are fixed vertically relative to the tub, thereby disengaging the locking straps from the adjuster arms to enable the rack to be lifted to the raised position. To lower the rack, the locking levers are again pivoted to reposition support members of the locking straps into positions offset from the adjuster arms, thereby enabling the rack to be guided to the lowered position where the locking tabs automatically engage the adjuster arms.

20 Claims, 16 Drawing Sheets

(56) References Cited

U.S. PATENT DOCUMENTS

2007/0226928 A1 10/2007 Bastuji
2009/0050186 A1 2/2009 Kim et al.
2011/0018410 A1 1/2011 Bastuji et al.
2014/0217868 A1 8/2014 Bhajak et al.

DISHWASHER WITH VERTICALLY ADJUSTABLE DISH RACK

CROSS REFERENCE TO RELATED APPLICATIONS

This application is a continuation in part of U.S. application Ser. No. 13/758,121 filed Feb. 4, 2013, now U.S. Pat. No. 9,579,009, which is incorporated herein by its entirety.

BACKGROUND OF THE INVENTION

The present invention pertains to the art of dishwashers and, more particularly, to a vertically adjustable dishwasher dish rack arrangement. A front loading dishwasher typically includes a tub having an open front. The tub defines a washing chamber into which items, such as kitchenware, glassware and the like, are placed to undergo a washing operation. The dishwasher is generally provided with a door, pivotally mounted to the tub, that closes the open front, and upper and lower extensible dish racks for supporting items during the washing operation. Typically, the upper and lower dish racks are separated by a defined vertical spacing that limits the overall size of items that can be placed in the dishwasher.

In order to provide more flexibility to consumers, manufacturers have developed adjustment mechanisms that enable at least one dish rack to be vertically adjustable. Most commonly, the upper dish rack can be vertically shifted to increase the defined vertical spacing between the upper and lower dish racks. Typically, the adjustment mechanisms are mounted on opposing sides of the dish rack and connect to extensible support rails that permit the dish rack to move in and out of the washing chamber. In many cases, the adjustment mechanisms have complicated structure, can be difficult to operate in transitioning from one height position to another, are unstable and/or are simply not reliable. There exists a need in the art for an advantageously designed, stable and reliable vertical height adjustment system for a dishwasher dish rack.

SUMMARY OF THE INVENTION

In one aspect, a dishwasher includes a tub having bottom, rear and side walls that collectively define a washing chamber. A dish rack in the washing chamber has a horizontal wire parallel to each side. A height adjustment system includes first and second height adjustment mechanisms provided along the dish rack at the horizontal wires for vertically shifting the dish rack between lowered and raised positions relative to the tub. Each of the first and second height adjustment mechanisms includes an adjuster arm slidably mounted to the dish rack and fixed vertically relative to the tub. The adjuster arm includes a catch, a stop disposed to engage the catch, and a locking lever disposed for pivotal movement relative to the rack, between an engaging position and a release position. The locking lever is disposed to urge the stop to engage the catch, wherein, when the locking lever is in the release position, the stop is free from engagement with the catch so that the dish rack is vertically adjustable relative to the adjuster arm and when the locking lever is in the engaging position, the stop engages the catch so that the dish rack is vertically locked relative to the adjuster arm.

In another aspect, the dish rack includes a plurality of spaced vertical wires connected to a plurality of spaced horizontal wires has a height adjustment system including at least a first and second height adjustment mechanisms provided along the side walls of the rack to enable vertical shifting of the rack between lowered and raised positions. Each of the height mechanisms has an adjuster arm that is fixed vertically relative to the tub, and has a plurality of spaced channel defining members which slidably receive respective vertically spaced wires as well as guide sliding interfaces which slidably receive the adjuster housing and one or more adjuster sliders for guiding movement of the rack between the rack height positions. A locking lever is mounted for pivotal movement relative to the rack and is configured to shiftably engage and disengage at least one catch of the adjuster arm to permit vertical shifting of the rack.

A method of adjusting the dish rack vertically by shifting from a raised or lowered position. A pivoting locking lever is provided in the adjuster housing to cause the stop to engage the catch provided in the adjuster arm. To lower the rack, the locking lever is pivoted to disengage a biasing arm from the adjuster arm catch to enable the rack to be lifted to a raised position. To lower the rack, the locking lever is pivoted to disengage the stop member of the biasing arm from the catch member of the adjuster arm enabling the rack to be shifted to the lower position.

With this arrangement, a dish rack can be readily repositioned between at least raised and lowered positions in an effective and reliable manner. Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF PREFERRED EMBODIMENTS

Figure 1:
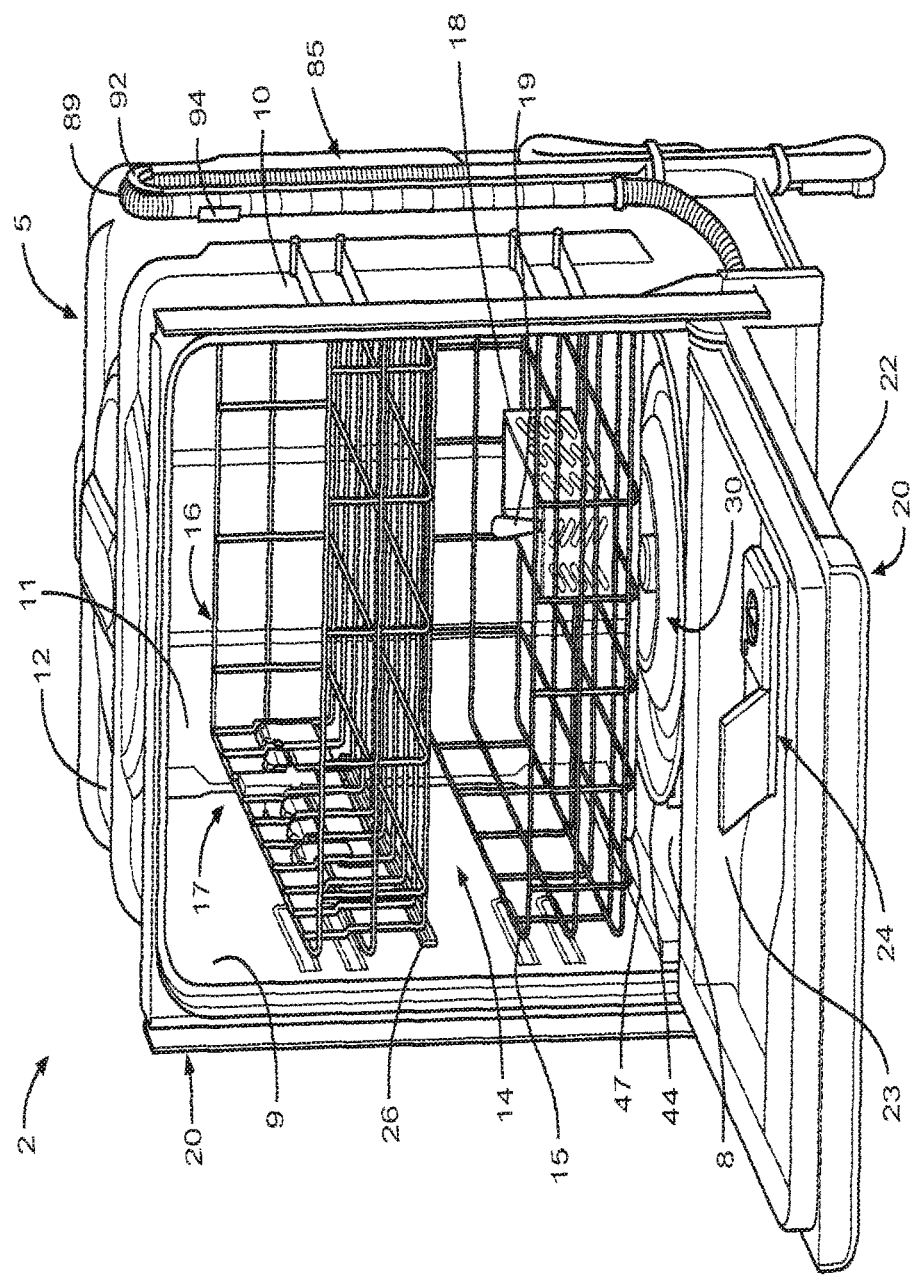
FIG. 1 is a perspective view of a dishwasher incorporating a dish rack having a vertical height adjustment mechanism constructed in accordance with the present invention.

With initial reference to FIG. 1, a dishwasher constructed in accordance with the present invention is generally indicated at 2. As shown, dishwasher 2 includes a tub 5, which is preferably injection molded of plastic, so as to include integral bottom 8, sides 9 and 10, rear 11 and top wall 12 respectively. Within the confines of walls 8-12, tub 5 defines a washing chamber 14 within which soiled kitchenware is adapted to be placed on a lower dish rack 15 and/or an adjustable upper dish rack 16 which, as will be detailed more fully below, includes a vertical adjustment system employing opposing side adjustment mechanisms 17 for vertically shifting the upper dish rack 16 between a first or lowered position and a second or raised position. As shown in this figure, a utensil basket 18, which contains a utensil 19, is positioned within the lower rack 15. Tub 5 has associated therewith a pivotally supported door 20 used to seal the washing chamber 14 during a washing operation. Door 20 has an exterior panel 22 and an interior panel 23 preferably provided with a dispensing assembly 24 within which a consumer can place liquid, particulate or gel washing detergent for dispensing at predetermined periods of the washing operation.

In a manner known in the art, upper dish rack 16 is horizontally shiftable between an interior position wherein upper dish rack 16 is entirely within the confines of washing chamber 14 and an exterior position, wherein upper dish rack 16 extends, at least partially outward, from washing chamber 14. Toward that end, dishwasher 2 is provided with extensible support rails, one of which is indicated generally at 26. In a similar manner, lower dish rack 15 is selectively, horizontally shiftable between interior and exterior positions. However, when in the exterior position, lower dish rack 15 rests upon an open door 20 on guide elements (not separately labeled) formed on interior panel 23.

Disposed within tub 5 and, more specifically, mounted within a central opening formed in bottom wall 8 of tub 5, is a pump and filter assembly 30. Extending about a substantial portion of pump and filter assembly 30, at a position raised above bottom wall 8, is a heating element 44. In a manner known in the art, heating element 44 preferably takes the form of a sheathed, electric resistance-type heating element. In general, pump and filter assembly 30 is adapted to direct washing fluid to a lower wash arm 47 and at least one upper wash arm (not shown). Dishwasher 2 has associated therewith a drain hose 85 including at least one corrugated or otherwise curved portion 89 that extends about an arcuate hanger 92 provided on an outside surface of side wall 10. Drain hose 85 is shown secured to tub 5 through various clips, such as that indicated at 94. In any event, in this manner, an upper loop is maintained in drain hose 85 to assure proper drainage in a manner known in the art. As the exact structure and operation of pump and filter assembly 30 of dishwasher 2 is not part of the present invention, it will not be discussed further herein. Instead, the present invention is directed to particulars of height adjustment mechanism 17. However, at this point it should be noted that the invention can be employed in connection with adjusting the height of dish racks in various types of dishwashers, including the more conventional type shown in FIG. 1 and drawer dishwashers. Of course, with drawer dishwashers, the dish rack would not be extensible, but still the dish rack could be vertically adjustable.

Figure 2:
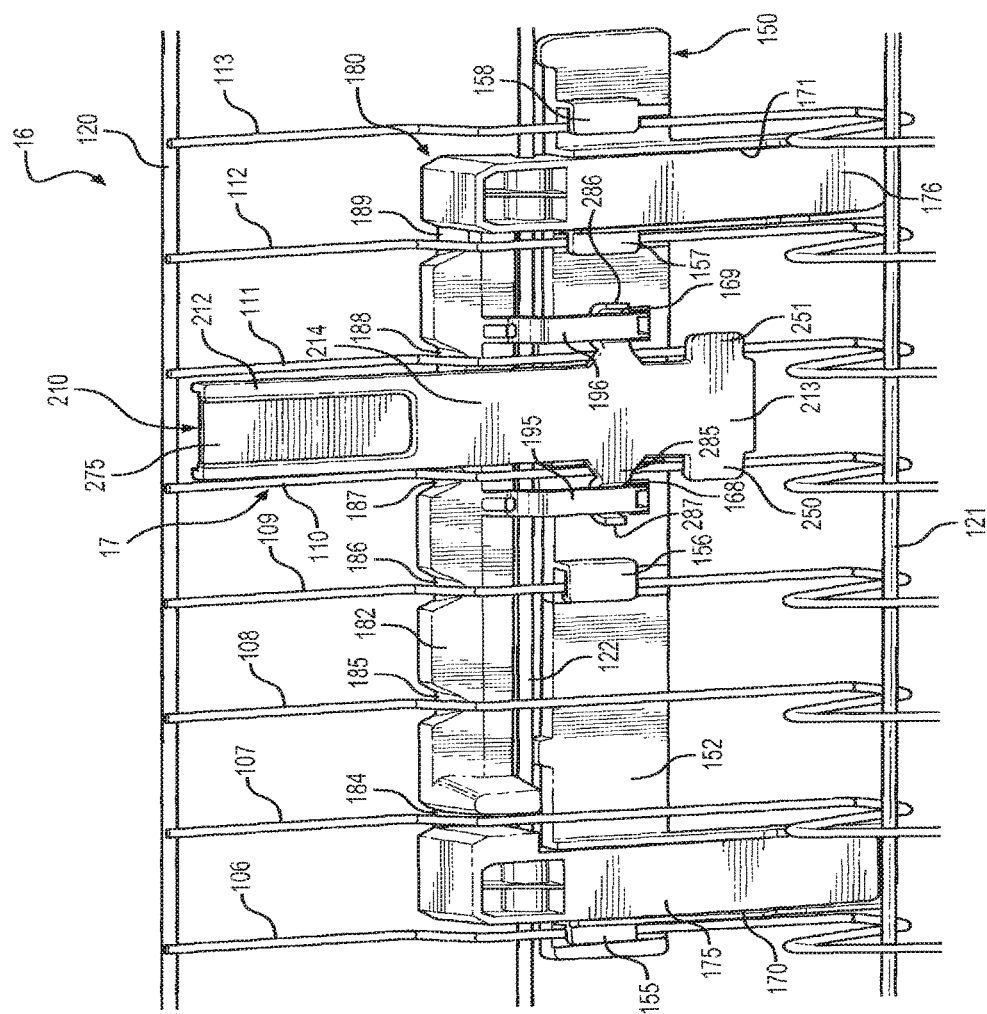
FIG. 2 is a perspective view of an inner side portion of the dish rack with the height adjustment mechanism from the dishwasher of FIG. 1 shown in a lowered position.
Figure 3:
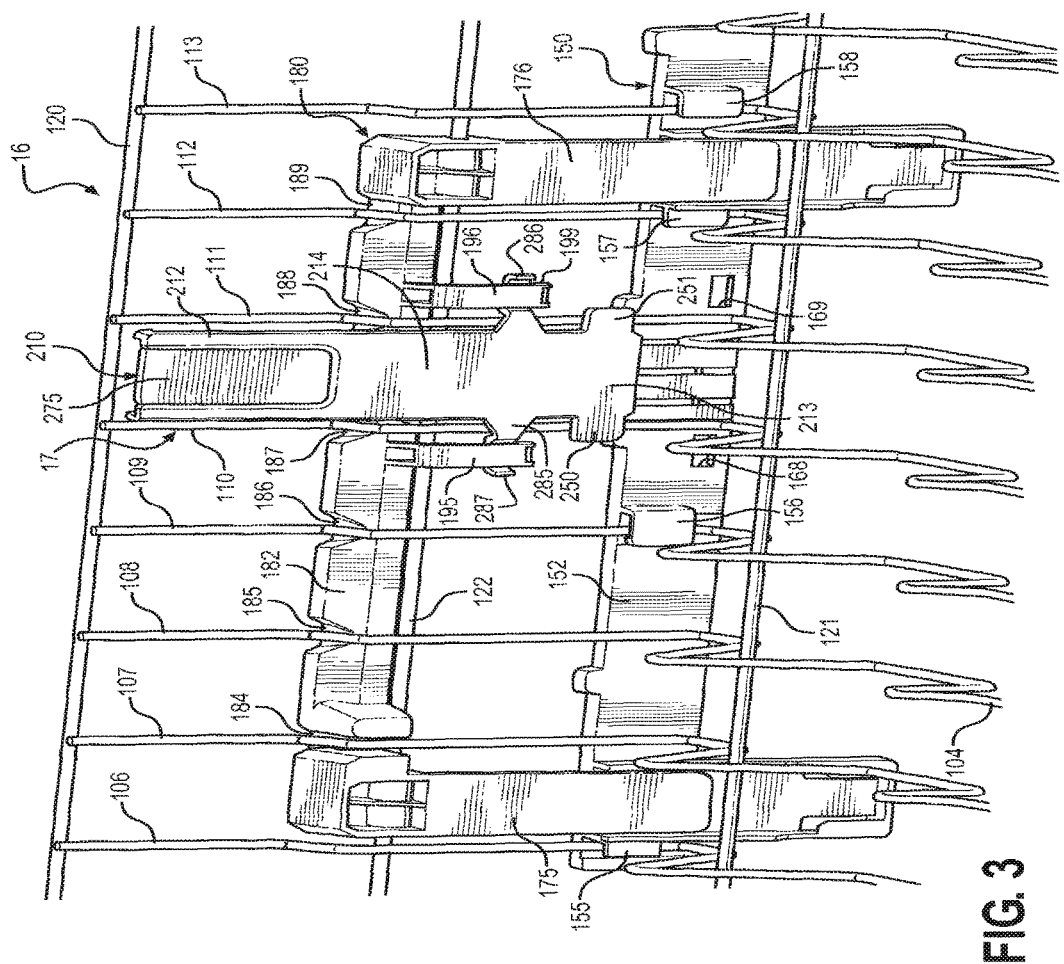
FIG. 3 is a perspective view of the inner side portion of the dish rack with the height adjustment mechanism from the dishwasher of FIG. 1 shown in a raised position.
Figure 4:
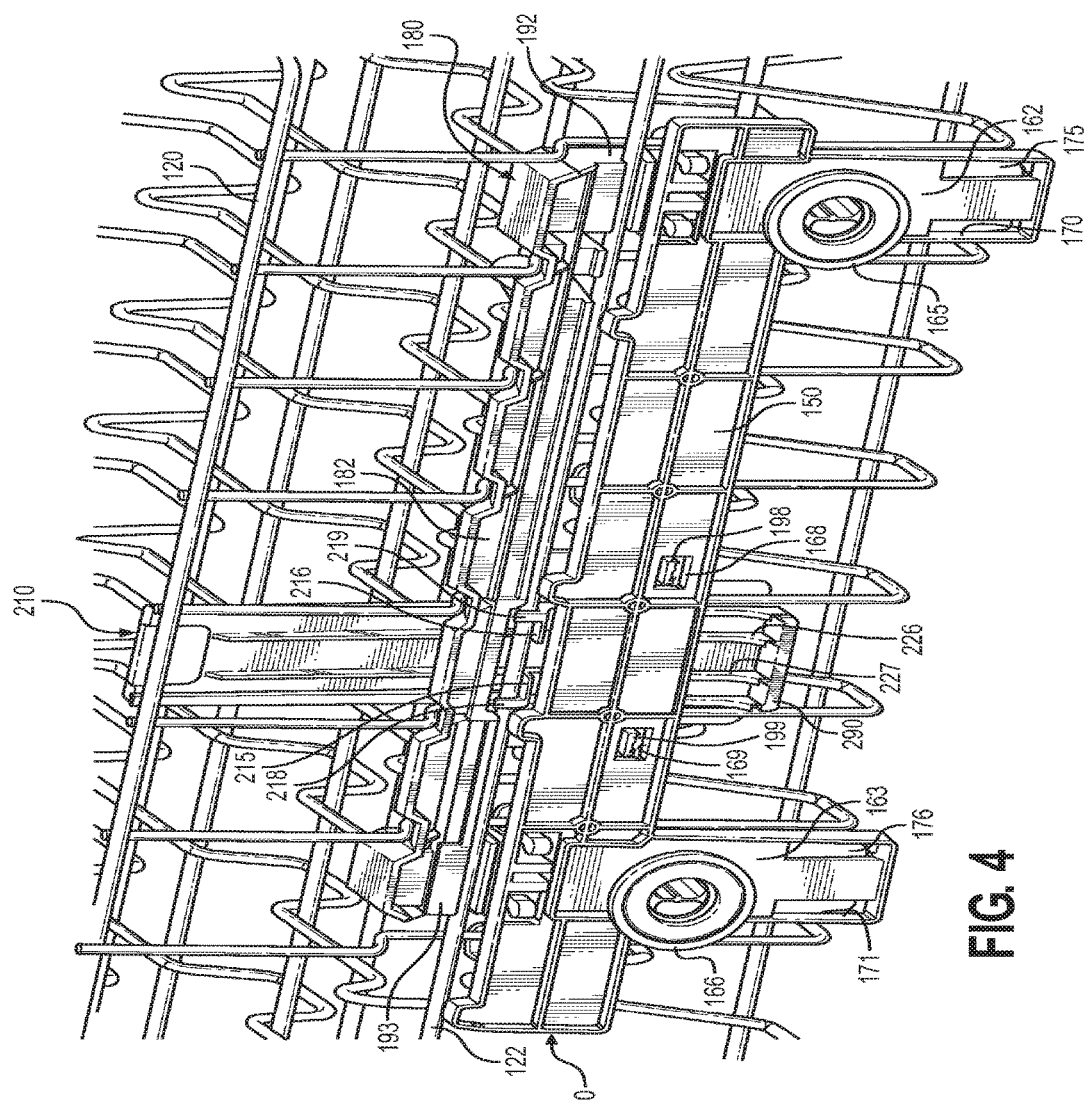
FIG. 4 is a perspective view of an outer side portion of the dish rack with the height adjustment mechanism from the dishwasher of FIG. 1.

Reference will now be made to FIGS. 2-4 in describing the particular details of each height adjustment mechanism 17 and its connection to rack 16. In the exemplary embodiment shown, rack 16 is formed of interconnected wires so as to define a plurality of generally horizontal or bottom rails, such as indicated at 104, which extend up and define generally vertical, opposing side rails, such as 106-113. Also shown is an upper peripheral rim rail 120, a lower peripheral rail 121, and an intermediate peripheral rail 122. As represented these figures, bottom rails 104 have portions thereof which define multiple levels for rack 16 and are formed with various raised rail portions, such as that indicated at 125, to more readily support various kitchenware items in a manner known in the art. In general, the particular construction and design of rack 16 can greatly vary.

Figure 10:
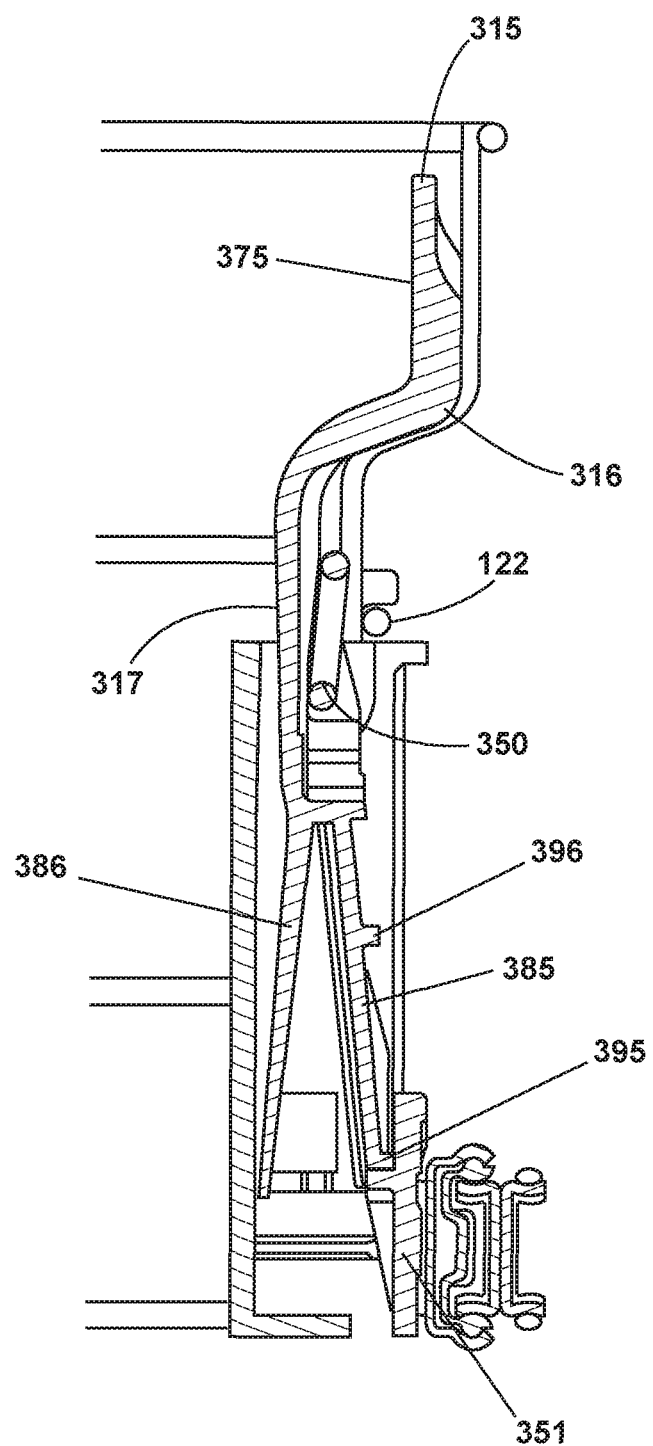
FIG. 10 is a partial, cross-sectional view of the locking lever mechanism in FIG. 8 in the raised position.
Figure 11:
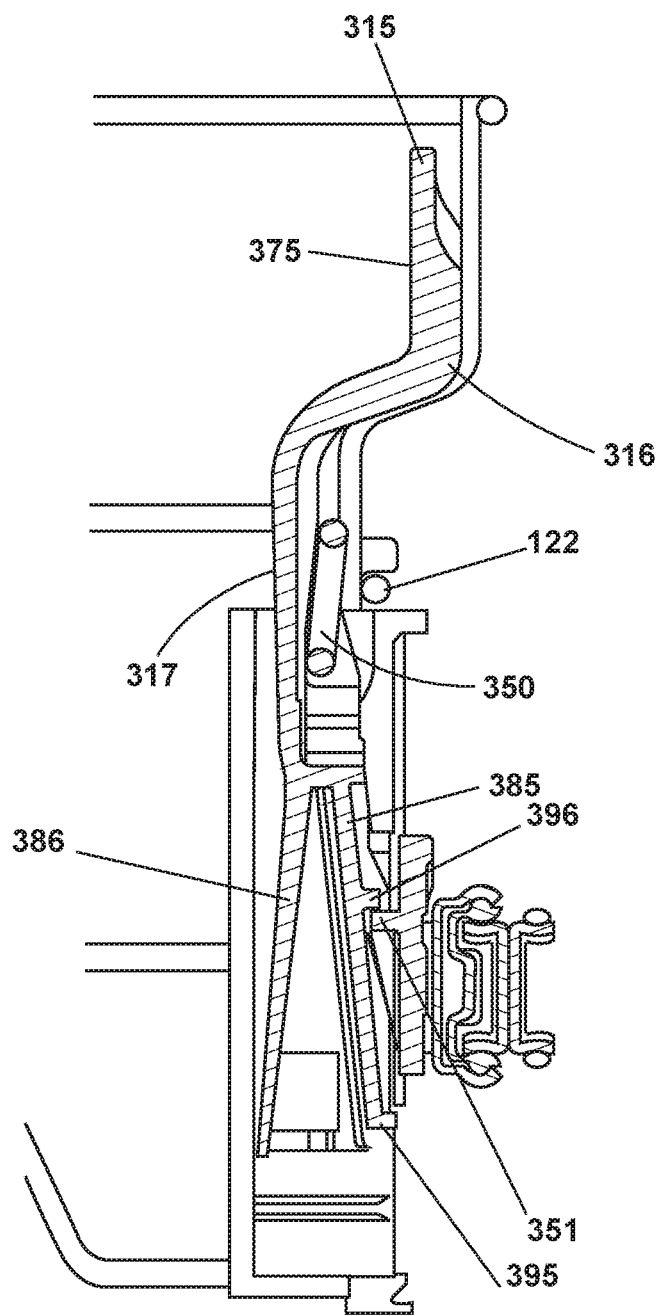
FIG. 11 is a partial, cross-sectional view of the locking lever mechanism in FIG. 8 in an intermediate position.
Figure 12:
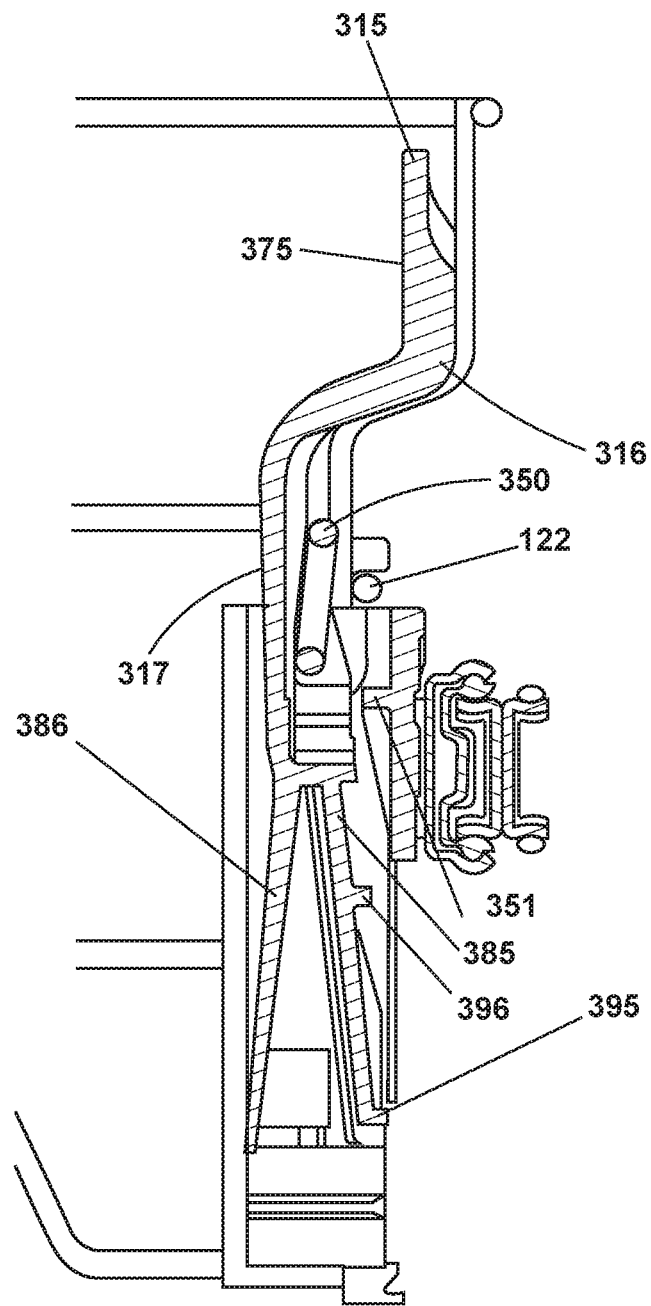
FIG. 12 is a partial, cross-sectional view of the locking lever mechanism in FIG. 8 in a lowest position.

Height adjustment mechanism 17 of the invention is shown to include an adjuster arm 150 having a main body portion 152 including, at spaced fore-to-aft locations, a plurality of channel defining members 155-158 that can be unequal or equidistant from one another laterally along the adjuster arm 150 or in any spatial relationship necessary as to receive the vertical side rails 106, 109, 112 and 113. Channel defining members 155-158 slidably receive respective vertical side rails 106, 109, 112 and 113 respectively. In this manner, rack 16 is guided for vertical movement relative to each adjuster arm 150. In connection with the embodiment shown wherein rack 16 is also mounted for sliding movement relative to tub 5, adjuster arm 150 includes mounting arms 162 and 163 (see FIG. 4) for rotatably supporting a pair of fore-aft-spaced wheels 165 and 166 which interact with a respective extensible support rail 26 carried by tub 5 in order to enable rack 16 to be shifted into and out of washing chamber 14. At this point, it is important to note that adjuster arm 150 is vertically fixed relative to tub 5, which in this embodiment is due to the connection with support rail 26, and rack 16 can shift vertically relative to adjuster arm 150 between at least a lowered position as shown in FIGS. 2 and 12 and a raised position as shown in FIGS. 3, 10 and 11. In addition, it should be noted that adjuster arm 150 is formed with a pair of locking slots or openings 168 and 169, shown intermediate channel defining members 156 and 157.

Adjuster arm 150 also includes a pair of fore-to-aft spaced guide pockets 170 and 171 defined, at least in part, by mounting arms 162 and 163. Each guide pocket 170, 171 slidably receives a respective leg 175, 176 extending substantially vertically at spaced fore-to-aft terminal locations from a locking strap 180. Locking strap 180 includes a main body portion 182 which is shown to extend substantially horizontally along rack 16 and includes notched zones 184-189 which receive bent portions (not separately labeled) of side rails 107-112 of rack 16. At this point, it should be recognized that locking strap 180 can be fixed to rack 16 in many different ways. In accordance with the embodiment depicted, locking strap 180 is snap-mounted onto intermediate peripheral rail 122 through split connectors 192 and 193 (particularly see FIG. 4). Regardless of the particular mounting arrangement employed, it is important to recognize that locking strap 180 is connected for concurrent vertical movement with rack 16. Also shown projecting from main body portion 182 of locking strap 180 is a pair of locking tabs 195 and 196. More specifically, each locking tab 195, 196 extends substantially vertically in a cantilevered manner from main body portion 182 and terminates in a laterally outwardly projecting catch member 198, 199 (particularly see FIG. 4).

Figure 5:
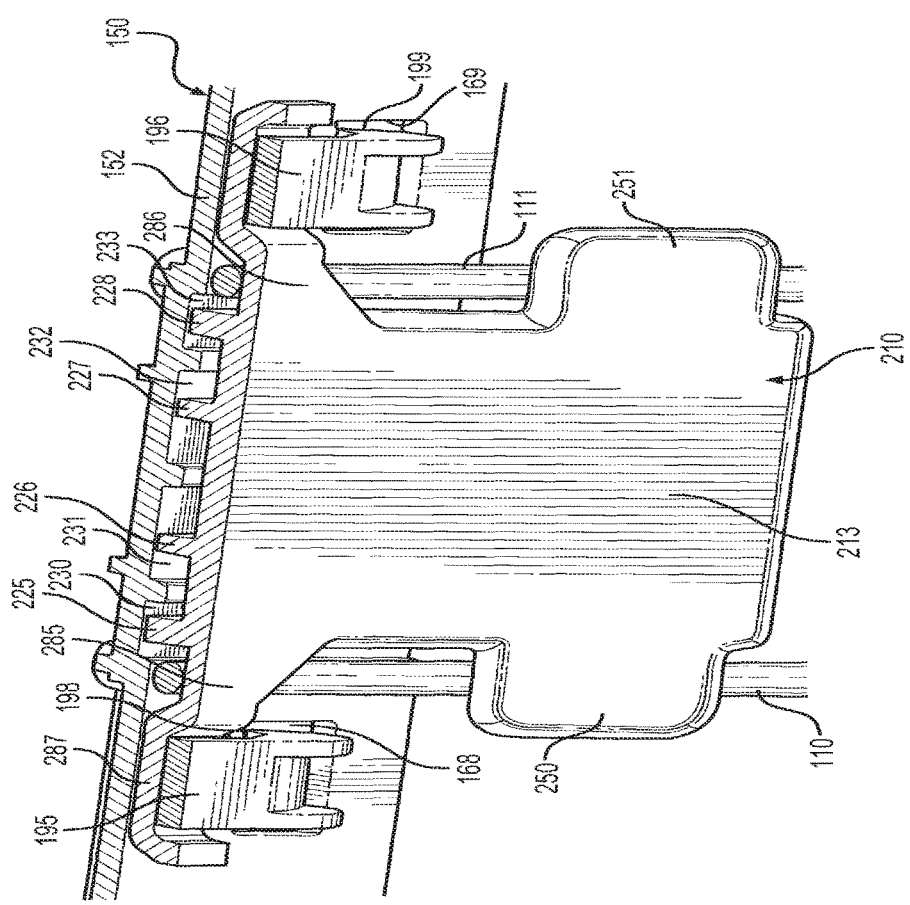
FIG. 5 is a partial, cross-sectional view of a latch release arrangement employed in the height adjustment mechanisms of FIG. 1.

In addition to the above structure, each adjustment mechanism 17 also includes a locking lever 210 having an upper portion 212, a lower portion 213 and an intermediate or central portion 214. Locking lever 210 is pivotally attached to and mounted for concurrent movement with rack 16. In the embodiment shown, locking lever 210 is directly pivotally attached to intermediate peripheral rail 122. More specifically, as best depicted in FIG. 4, a laterally outward side of locking lever 210 is formed with at least one projection 215, 216 which establishes a ledge from which extends a pair of upstanding flanges 218 and 219. Intermediate peripheral rail 122 is captured behind flanges 218 and 219, while generally resting on the ledge so as to define a pivot axis for locking lever 210. At the same time, the outward side of locking lever 210 is formed with various spaced ribs 225-228 which align with channels 230-233 formed in main body portion 182 of locking strap 180 (see FIG. 5). In this manner, locking lever 210 is both supported for pivotal movement and retained against any significant fore-to-aft movement.

Locking lever 210 is preferably biased such that the lower portion 213 is forced laterally outwardly. To limit movement of locking lever 210 based on this biasing force, the lower portion 213 is provided with a pair of stop abutment members 250 and 251 which engage rails 110 and 111 respectively. In accordance with the invention, the biasing can be performed in various ways. For instance, one or more torsion springs could be provided, such as about intermediate rail 122 defining the pivot axis. However, in one embodiment depicted in FIG. 6, the biasing is performed by forming the locking lever 210 with a rear, cantilevered plate 260 have an upper free end provided with ear members, one of which is shown at 265, which abut rails 110 and 111. With this arrangement, stop abutment members 250 and 251 are biased into a position engaging rails 110 and 111, but locking lever 210 can be selectively rotated about the pivot axis defined by intermediate rail 122 relative to rack 16 against this biasing force. As will be detailed more fully below, upper portion 212 of each locking lever 210 is provided with a thumb engaging region 275 for this purpose. However, prior to discussing the operation of adjustment mechanism 17, reference is made to the inclusion of wing members 285 and 286 which respectively project rearward and forward (fore and aft) from the intermediate portion 214 of locking lever 210. Each wing member 285, 286 includes a terminal cup member 287 which is interposed between main body portion 152 of adjuster arm 150 and a respective one of the cantilevered locking tabs 195, 196 at a position spaced from a corresponding catch member 198, 199. Finally, locking lever 210 is provided with a support member 290 projecting laterally from lower portion 213 as best shown in FIG. 4.

With the inclusion of the adjustment system of the invention, dish rack 16 can be effectively and reliably shifted between the lower position shown in FIG. 2 and the raised position shown in FIG. 3. More specifically, to raise dish rack 16, a user need simply engage the upper portions 212 of locking levers 210, such as by pressing thumb engaging portions 275, to cause pivoting of locking levers 210 about the pivot axis defined by intermediate rail 122 at central portion 214 against the biasing force caused by ear members 265 of rear plate 260 engaging rails 110 and 111. Pivoting each locking lever 210 causes wing members 285 and 286 to deflect locking tabs 195 and 196 so as to shift catch members 198 and 199 from within locking openings 168 and 169. At this point, rack 16 can be lifted vertically, with legs 175 and 176 being guided in guide pockets 170 and 171. At the same time, rack 16 is also guided by rails 106, 109, 112 and 113 sliding relative to channel defining members 155-158. When dish rack 16 reaches the raised position, which is prior to bottom rails 104 reaching the channel defining members 155-158, the support member 290 on each adjustment mechanism 17 will be located vertically above a respective adjuster arm 150. The release of locking levers 210 enables dish rack 16 to be supported upon adjuster arms 150 as illustrated in FIG. 3, with each support member 290 sitting directly upon a respective adjuster arm 150 and stop abutment members 250 and 251 preventing pivoting of locking lever 210 in one direction. A similar operation is performed to selectively reposition dish rack 16 back to the lowered position of FIG. 2 by again pivoting locking levers 210 through thumb engaging portions 275 to reposition support members 290 offset from adjuster arms 150 thereby enabling dish rack 16 to be guided to the lowered position whereat catch members 198 and 199 can automatically snap or otherwise extend back into locking openings 168 and 169 while stop abutment members 250 and 251 engage rails 110 and 111 respectively.

Figure 6:
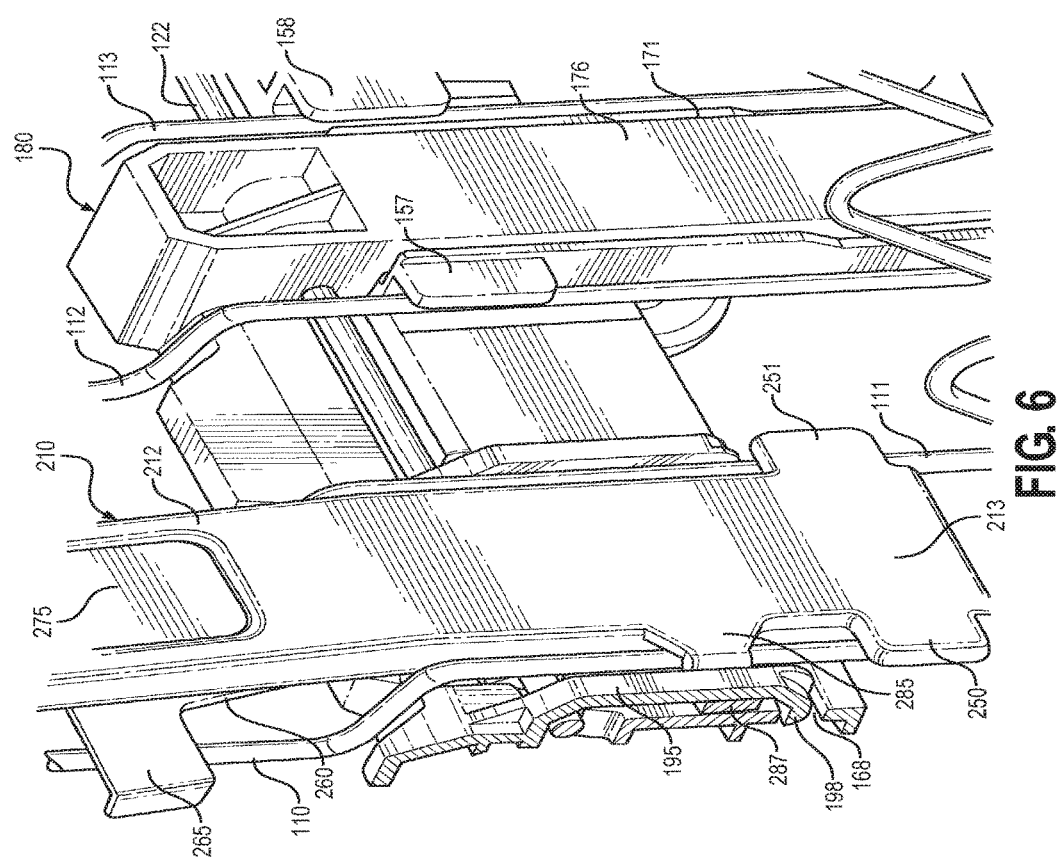
FIG. 6 is a perspective view similar to FIG. 2, but illustrating an inner side portion of the dish rack with a modified version of the height adjustment mechanism.
Figure 7:
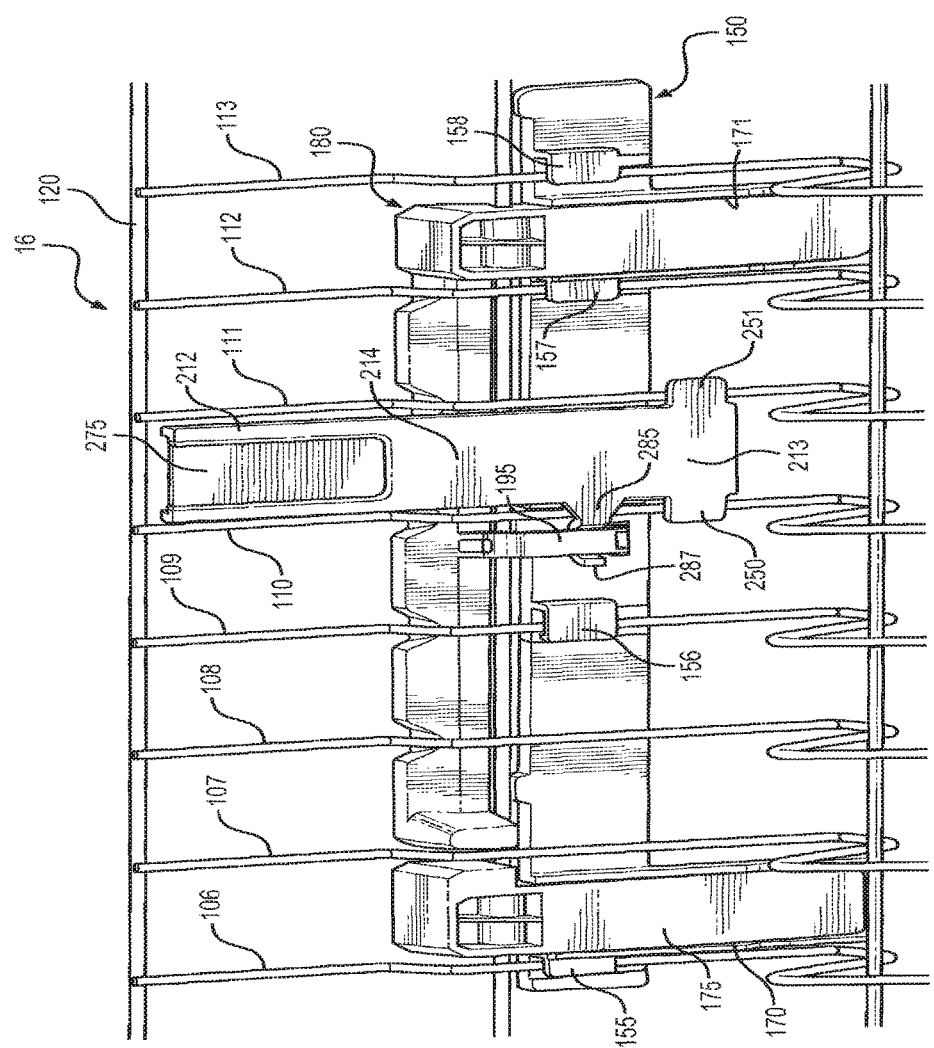
FIG. 7 is a partial cross-sectional view of a latch release arrangement employed in the modified height adjustment mechanism of FIG. 6.
Figure 8:
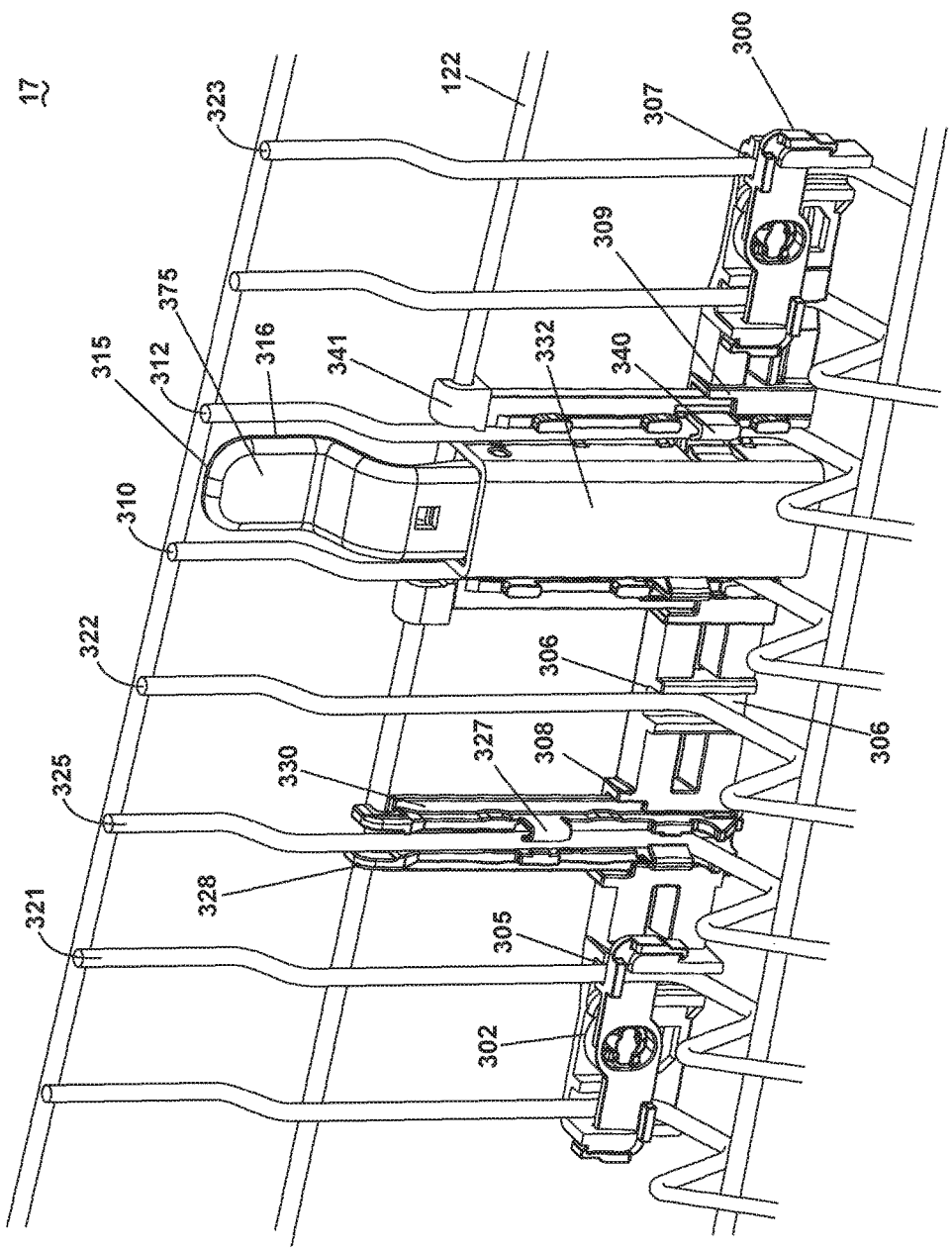
FIG. 8 is a side perspective view of the height adjustment mechanism attached to the dish rack in one embodiment of the invention from the inside of the rack.

In accordance with the present invention, the particular number of locking tabs, as well as the corresponding locking openings and wing members, can vary. To this end, FIGS. 6 and 7 depict an embodiment exhibiting all the same structure to that described above but wherein only a single catch member 198 for a single locking tab 195 is used in conjunction with an adjuster arm having a single locking opening 168 and a locking lever having a single wing member 285. As the raising/lowering operation of this embodiment is essentially identical to that described above in detail, the operation description will not be reiterated here.

In another embodiment of the present invention, illustrated by example in FIGS. 8-12, height adjustment system 17 of the invention is shown to include an adjuster arm 300 having a main body portion 302 including, at spaced fore-to-aft locations, a plurality of channel defining members 305, 306, 307, 308 and 309. Channel defining members 305, 306, and 307 slidably receive respective vertical side rails 321, 322, and 323 respectively. Sliding interface member 308 slidably receives adjuster slider 330 and sliding interface member 309 slidably receives adjuster housing 332. In this manner, rack 16 is guided for vertical movement relative to each adjuster arm 300. In connection with the embodiment shown wherein rack 16 is also mounted for sliding movement relative to tub 5, adjuster arm 300 includes a pair of fore-to-aft spaced wheels 365 and 366 which interact with a respective extensible support rail 26 carried by tub 5 in order to enable rack 16 to be shifted into and out of washing chamber 14. At this point, it is important to note that adjuster arm 300 is vertically fixed relative to tub 5, which in this embodiment is due to the connection with support rail 26, and rack 16 can shift vertically relative to adjuster arm 300 between at least a raised position as shown in FIG. 10 and a lowered position as shown in FIG. 12.

Figure 9:
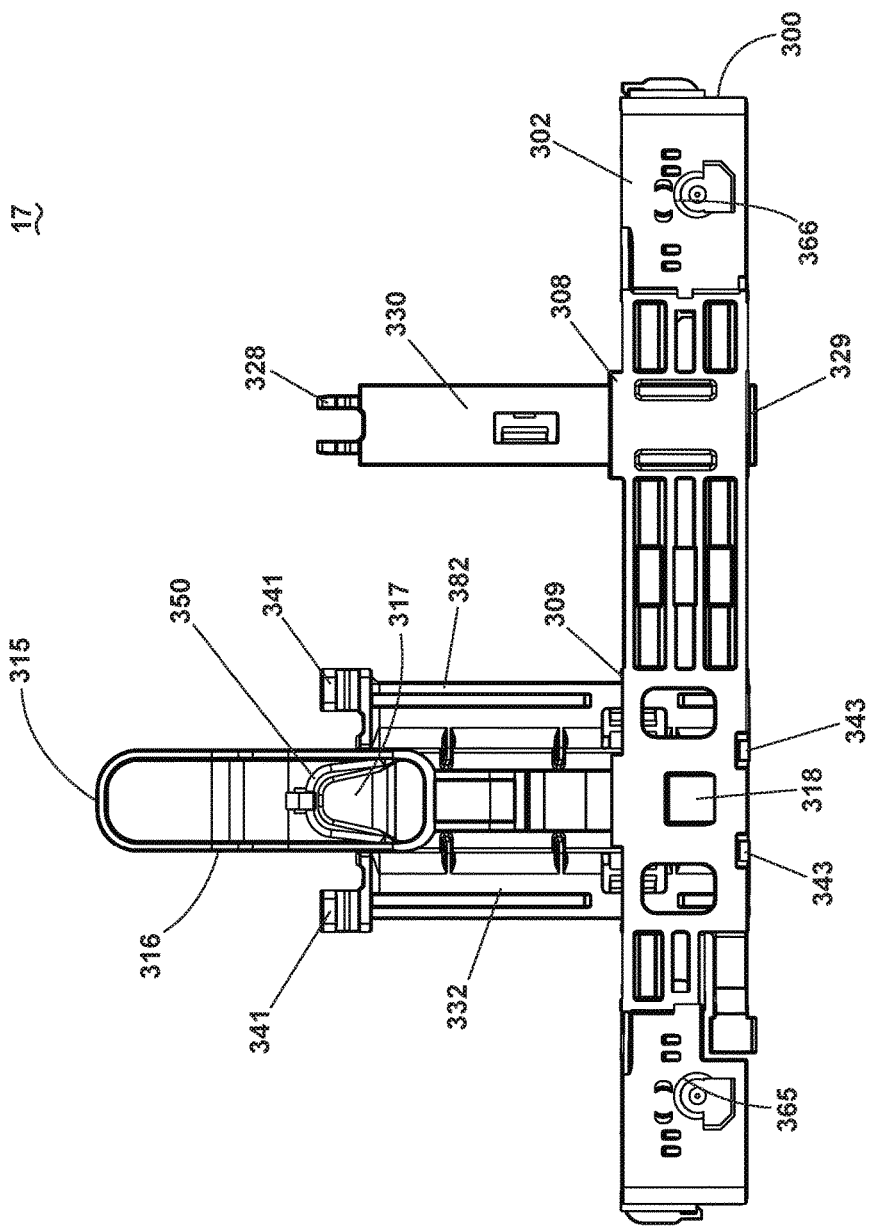
FIG. 9 is a side perspective view of the outer portion of the dish rack height adjustment mechanism in FIG. 8.

Adjuster arm 300 also includes a pair of fore-to-aft spaced guide sliding interface members 308 and 309 which slidably receive adjuster slider 330 and adjuster housing 332 respectively. At this point, it should be recognized that adjuster slider 330 and the adjuster housing 332 can be fixed to rack 16 in many different ways. In accordance with the embodiment depicted, the adjuster slider 330 extends vertically and is snap-mounted to rack 16 by a plurality of locking tabs 327 constraining vertical rail 325. In addition, adjuster slider 330 fixedly mounts to intermediate rail 122 by one or more locking clamps 328. In similar fashion, adjuster housing 332 extends vertically and snap-mounted to rack 16 by a plurality of locking tabs 340 constraining vertical rails 310 and 312. In addition, the adjuster housing 332 fixedly mounts to intermediate rail 122 by one or more locking clamps 341. One or more support members 329 and 343 terminate the lower portion of the adjuster slider 330 and the adjuster housing 332 respectively and catch the adjuster arm 300 when the rack 16 is in the highest raised position (FIG. 9). Regardless of the particular mounting arrangement employed, it is important to recognize that the adjuster slider 300 and adjuster housing 332 are connected for concurrent vertical movement with rack 16.

In addition to the above structure, each adjustment mechanism 17 also includes a locking lever 315 having an upper portion 316, a lower portion 318 and an intermediate or central portion 317 as seen best in FIG. 9. Upper portion 316 of locking lever 315 is provided with a thumb engaging region 375. Locking lever 315 is pivotally attached to pivot pin 350 which is mounted to adjuster housing 332 for concurrent movement with rack 16.

Figure 13:
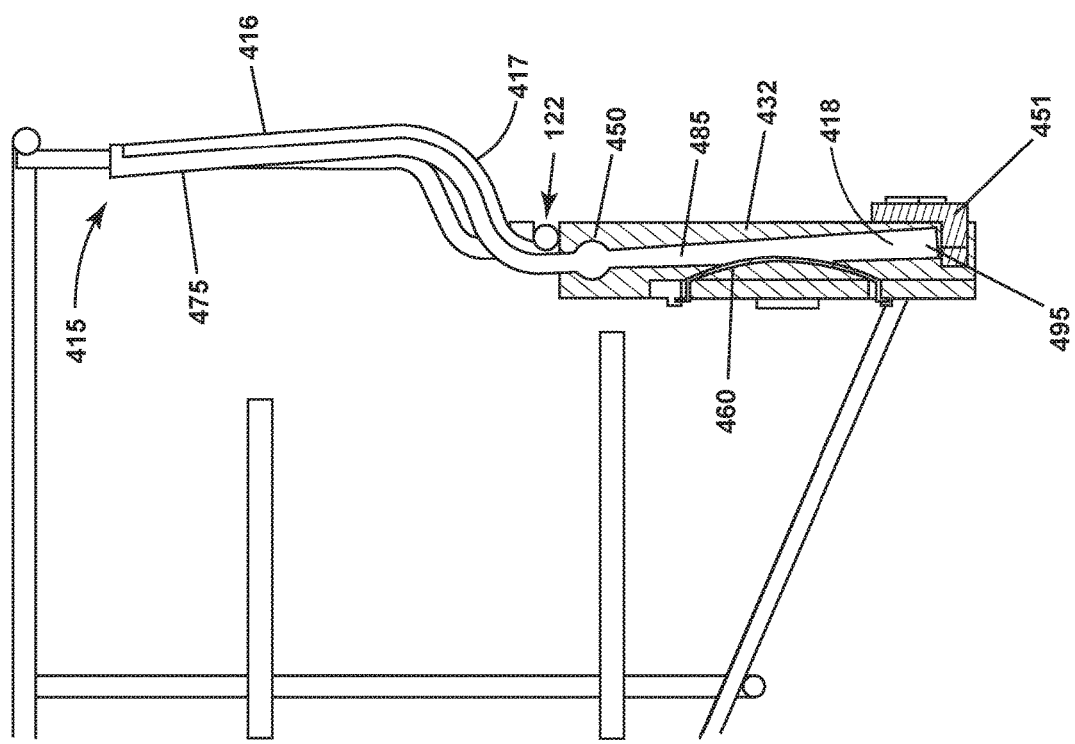
FIG. 13 is a side perspective view of a cross section of the height adjustment mechanism according to another embodiment of the invention with the rack in an uppermost position.
Figure 14:
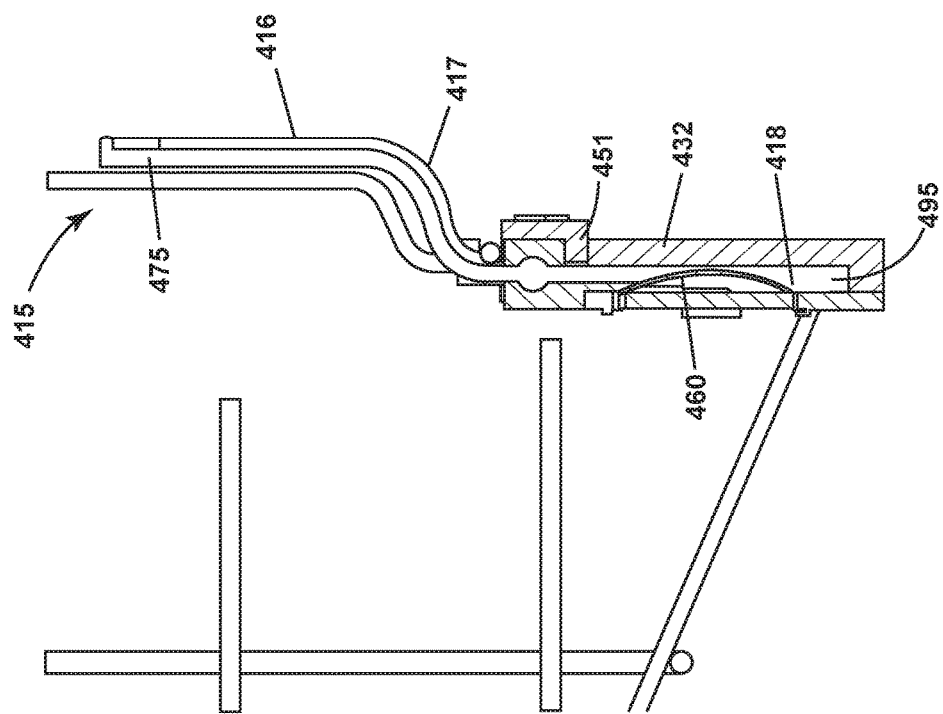
FIG. 14 is a side perspective view of a cross section of the height adjustment mechanism according to the embodiment of FIG. 14 with the rack in a lowest position.

In the embodiment shown in FIGS. 8-12, locking lever 315 is preferably biased such that the lower portion 318 is comprised of integrated biasing arms 385 and 386 both forced laterally outwardly (FIGS. 10-12). To limit movement of locking lever 315 based on this biasing force, the arm 385 is provided with stop members 395 and 396 which engage catch 351 respectively. In accordance with the invention, the biasing can be performed in various ways. Furthermore, in FIGS. 13 through 16, similar alternative embodiments to FIGS. 8-12, are illustrated with like parts identified by like numerals increasing by 100, with it being understood that the description of the like parts of the first embodiment applies to the additional embodiment, unless otherwise noted. In one embodiment, as seen in FIGS. 13 and 14, a leaf spring 460 could be provided mounted in a lower portion of the adjuster housing 432 to bias the lower portion 418 of locking lever 415 with a lateral outward force. In this embodiment, the lower portion 418 of locking lever 415 is comprised of arm 485 and terminates with stop member 495 which engages catch 451 respectively. In FIG. 15 (A-C), locking lever 515 comprises integrated biasing stop member 595 which engages intermediate peripheral rail 122 for a variety of rack heights. In FIG. 16 (A-C), locking lever 615 comprises integrated biasing stop member 695 which engages intermediate peripheral rail 122 for a variety of rack heights.

With the inclusion of the adjustment system of the invention, dish rack 16 can be effectively and reliably shifted between the raised position shown in FIG. 10 and the lower position shown in FIG. 12. More specifically, to raise dish rack 16, a user need simply engage the upper portions 316 of locking levers 315, such as by pressing thumb engaging portions 375, to cause pivoting of locking lever 315 about the pivot axis provided by pivot pin 350 at central portion 317 against the biasing force caused by integrated biasing arms 385 and 386. The rack 16 can be lifted vertically with adjuster housing 332 and adjuster slider 330 being guided in sliding channel members 309 and 308 respectively. At the same time, rack 16 is also guided by rails 321, 322, and 323 sliding relative to channel defining members 305-307. When dish rack 16 reaches a first raised position, the release of locking lever 315 enables stop member 396 of arm 385 to engage catch 351.

From this position, pivoting the locking lever 315 frees stop 396 from engagement with catch 351. The rack 16 can again be lifted vertically. When dish rack 16 reaches a second raised position, the release of locking lever 315 enables stop member 395 of arm 385 to engage catch 351 respectively. The support members 329 and 343 of the adjuster slider 330 and the adjuster housing 332 respectively will abut the adjuster arm 300 when rack 16 is in the highest raised position. By example, dish rack 16 has three height positions, however, it should be noted that the configuration of height positions may vary for any of the embodiments of the present invention.

In another embodiment as shown by example in FIGS. 13 and 14, to raise dish rack 16, a user need simply engage the upper portions 416 of locking lever 415, such as by pressing thumb engaging portions 475, to cause pivoting about the pivot axis provided by pivot pin 450 against the biasing force caused by leaf spring 460. When dish rack 16 reaches a raised position, the release of locking lever 415 enables stop member 496 of arm 485 to engage catch 451. As the raising/lowering operation of this embodiment is essentially identical to that described above in detail, the operation description will not be reiterated here.

In additional embodiments exemplified in FIGS. 15 and 16, intermediate peripheral rail 122 functions as a datum wire of the dishwasher rack 16 in which rack height is keyed. The set height of the rack 16 is set by the intermediate wire 122 and locking lever (515 or 615 by example) is pivoted to allow a user to move the rack up or down with respect to intermediate wire 122, providing the ability to adjust rack 16 height in the vertical direction while capturing the same horizontal section of wire 122 with each adjustment.

Figure 15A:
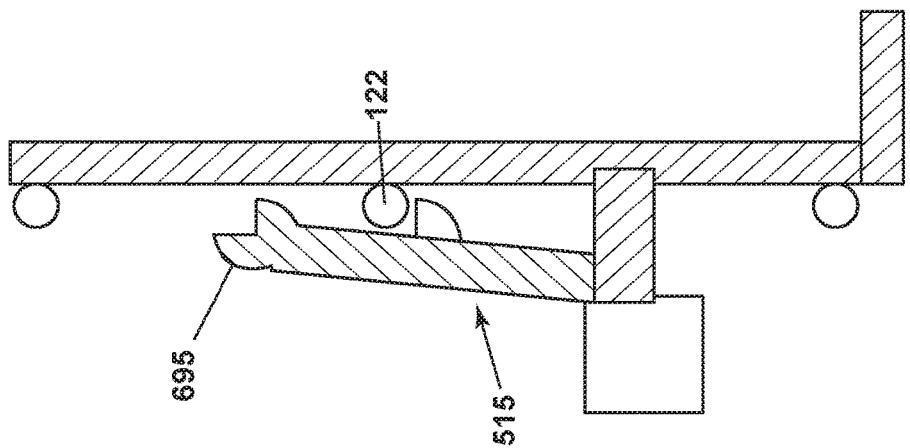
FIG. 15 (A-C) is a schematic drawing of a catch and release rack height adjustment mechanism according to an embodiment of the invention.
Figure 15B:
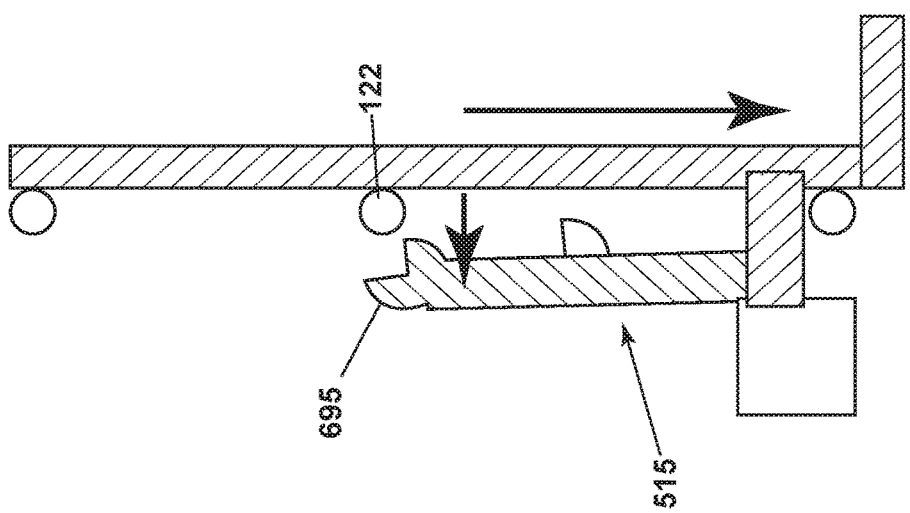
Figure 15C:
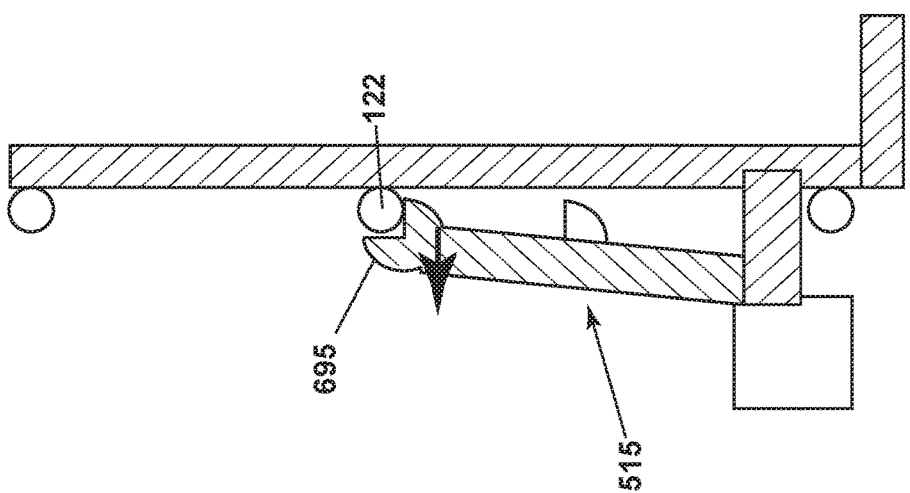

As shown by example in FIG. 15 (A-C), stop 595 of locking lever 515 engages intermediate peripheral rail 122 (FIG. 15A). Pivotally actuating locking lever 515 releases stop 595 from rail 122 (FIG. 15B) allowing rack 16 to be lifted vertically until stop 596 engages with rail 122 (FIG. 15C). In other embodiments of this example, locking lever 515 may be provided with a plurality of stops to allow for a plurality of rack heights. Stops 595, 596, and any additional stops provided to locking lever 515 may be of any shape that effectively secures and supports intermediate peripheral rail 122 when in the engaged position.

Figure 16C:
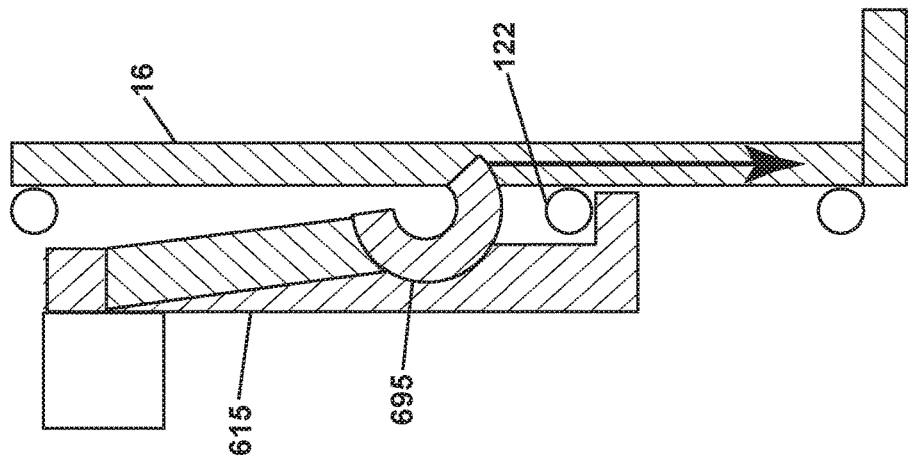
FIG. 16 (A-C) is a schematic drawing of a catch and release rack height adjustment mechanism according to an embodiment of the invention.
Figure 16B:
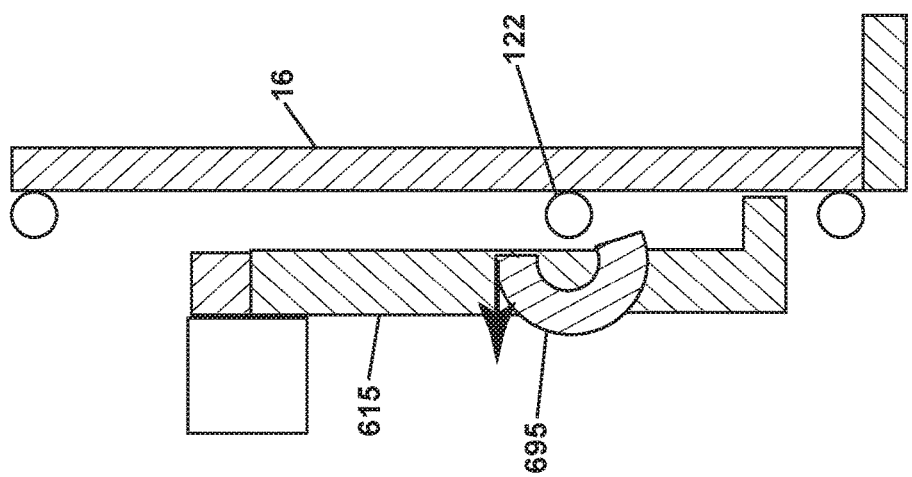
Figure 16A:
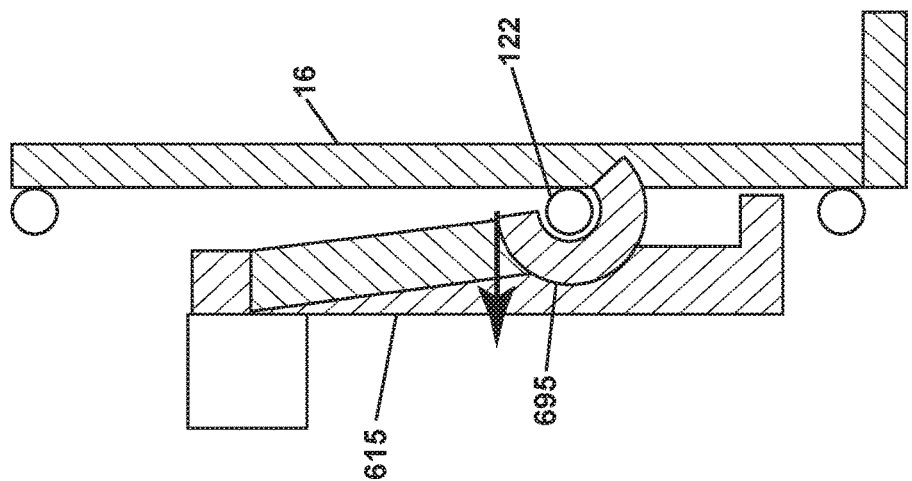

In another embodiment as shown by example in FIG. 16 (A-C), stop 695 of locking lever 615 engages intermediate peripheral rail 122 (FIG. 16A). Pivotally actuating lever 615 releases stop 695 from rail 122 (FIG. 16B) allowing rack 16 to be vertically lifted until stop 696 engages with intermediate peripheral rail 122 (FIG. 16C).

Based on the above, it should be readily apparent that the dish rack adjustment system of the invention accommodates vertical repositioning of a dish rack between at least upper and lower positions in an effective and reliable manner. In particular, it should be noted that the structure retaining the rack in the lowered position acts separate from the locking levers, while the locking levers include structure to release the rack for vertical movement. In addition, the locking levers themselves include additional structure to directly retain the rack in the raised position. In any case, although described with respect to preferred embodiments of the invention, it should be readily understood that various changes and/or modifications can be made to the invention without departing from the spirit thereof. For instance, although the invention is described for use on a wire dish rack, it should be recognized that the vertical adjustment system can be employed with various rack constructions, including molded racks, such as racks molded of plastic, with molding also being the preferred manner to establish each of the parts of the adjustment system. In general, the invention is only intended to be limited by the scope of the following claims.

What is claimed is:

1. A dishwasher comprising:
a tub having at least bottom, top, rear and side walls that collectively define a washing chamber;
a dish rack in the washing chamber having a horizontal wire parallel to each side wall; and
a height adjustment system including first and second height adjustment mechanisms provided along the dish rack at the horizontal wires for vertically shifting the dish rack between lowered and raised positions relative to the tub, each of said first and second height adjustment mechanisms including:
an adjuster arm having a main body that laterally extends along a length of the dish rack and is slidably mounted to the dish rack and configured for vertical movement relative to the dish rack and fixed vertically relative to the tub, the adjuster arm including at least one catch;
and
a locking lever including a set of stops adapted to engage the at least one catch and where the locking lever is operably coupled to the dish rack for pivotal movement relative to the dish rack, between an engaging position where at least one stop of the set of stops engages the at least one catch so that the dish rack is vertically locked relative to the adjuster arm and a release position where the at least one stop of the set of stops is free from engagement with the at least one catch so that the dish rack is vertically adjustable relative to the adjuster arm.

2. The dishwasher according to claim 1 wherein the locking lever has at least one arm.

3. The dishwasher according to claim 1, wherein the locking lever is pivotally mounted to the horizontal wire.

4. The dishwasher according to claim 1, wherein the at least one stop of the set of stops engages the at least one catch in the raised position and the at least one stop is not engaged with the at least one catch in the lowered position.

5. The dishwasher according to claim 4, comprising one of at least two stops or two catches, thereby enabling at least two raised positions.

6. The dishwasher according to claim 1, further comprising means for biasing the locking lever toward the engaging position.

7. The dishwasher according to claim 6 wherein the means for biasing the locking lever is one of a leaf spring, an integrated portion of the at least one stop of the set of stops, or an integrated portion of the locking lever.

8. The dishwasher according to claim 6 wherein the locking lever further comprises integrated biasing arms forced laterally outwards and one of the integrated biasing arms includes multiple stops configured to engage the at least one catch thereby enabling multiple positions.

9. The dishwasher according to claim 1 wherein the locking lever is mounted to a pivot pin, which is mounted to the horizontal wire.

10. The dishwasher according to claim 1, further comprising an adjuster housing mounted to the horizontal wire and wherein the adjuster housing is received within a portion of the main body of the adjuster arm.

11. The dishwasher according to claim 1 wherein the adjuster housing houses the locking lever and is snapably engaged with the horizontal wire of the dish rack.

12. The dishwasher according to claim 1, wherein the adjuster arm is provided with fore-to-aft spaced sliding interfaces, with the adjuster housing and at least one adjuster slider being slidably received in the sliding interfaces for guiding movement of the dish rack between rack height positions.

13. The dishwasher according to claim 1, wherein the dish rack includes a plurality of spaced vertical wires connected to a plurality of spaced horizontal wires and wherein the adjuster arm includes a plurality of spaced channel defining members which slidably receive respective ones of the plurality of spaced vertical wires.

14. A dishwasher comprising:
a tub having at least bottom, rear and side walls that collectively define a washing chamber;
a dish rack in the washing chamber, said dish rack including a plurality of spaced vertical wires connected to a plurality of spaced horizontal wires; and
a height adjustment system including first and second height adjustment mechanisms provided along the side walls of the dish tub for vertically shifting the dish rack between lowered and raised positions relative to the tub, each of said first and second height adjustment mechanisms including:
an adjuster housing defining an interior;
a locking lever at least partially received within the interior, the locking lever including at least one stop and where the locking lever is operably coupled to the dish rack for pivotal movement relative to the dish rack; and
an adjuster arm fixed vertically relative to the tub and configured for vertical movement relative to the dish rack, said adjuster arm having a main body including a plurality of laterally spaced channels defining members which slidably receive respective ones of the plurality of spaced vertical wires, the main body including at least one catch, and
the main body of the adjuster arm further includes at least fore-to-aft spaced guide sliding interfaces which slidably receive the adjuster housing and at least one adjuster slider for guiding movement of the dish rack between rack height positions;
wherein the locking lever is pivotal between an engaging position where the at least one stop engages the at least one catch so that the dish rack is vertically locked relative to the adjuster arm and a release position where the at least one stop is free from engagement with the at least one catch so that the dish rack is vertically adjustable relative to the adjuster arm.

15. A method of adjusting a dish rack supported for selective vertical movement between lowered and raised positions within a dishwasher tub comprising:
for shifting from the lowered position to the raised position, pivoting a locking lever provided in an adjuster housing that is operably coupled to the dish rack to cause a stop member on the locking lever to engage a catch on an adjuster arm, which is fixed vertically relative to the dishwasher tub and configured for vertical movement relative to the dish rack thereby disengaging the locking lever from the adjuster arm catch to enable the dish rack to be lifted to the raised position; and for shifting from the raised position to the lowered position, pivoting the locking lever to disengage the stop member of the locking lever from the catch of the adjuster arm, thereby enabling the dish rack to be shifted to the lowered position.

16. The method of claim 15, further comprising biasing the locking lever into positions which will maintain each of the raised and lowered positions.

17. The method of claim 15 wherein the locking levers are directly supported by a pivot pin for pivotal movement.

18. The method of claim 15, further comprising guiding movement of the adjuster housing through the entire movement of the dish rack between the lowered and raised positions.

19. The method of claim 15, further comprising guiding movement of the dish rack relative to the adjuster arms with vertical wires of the dish rack being slidably received in spaced channel defining members of the adjuster arm.

20. The method of claim 15, further comprising supporting the dish rack for movement into and out of the tub through extensible rails to which the adjuster arms are directly connected.

* * * * *